Patented Nov. 4, 1952

2,616,508

UNITED STATES PATENT OFFICE 2,616,508

CONTROL SYSTEM FOR GAS TURBINE PROPELLER ENGINES

Frank C. Mock, South Bend, Ind., assignor to Bendix Aviation Corporation, South Bend, Ind., a corporation of Delaware Application September 12, 1946, Serial No. 696,396

10 Claims. (Cl. 170—135.74)

This invention relates to a fuel feed and power control system for gas turbine engines or power plants utilizing the force or energy produced by the combustion and expansion of fuel and pre-compressed air; it is particularly adapted for gas turbine engines of the variable speed, variable load type, as where the engine has a driving connection with a variable-pitch propeller and wherein the power output may be controlled by selectively varying the rate of fuel feed and/or the pitch of the propeller blades, in contradistinction to gas turbine engines of the straight jet type wherein the power output may be controlled simply by varying the rate of fuel feed.

An object of the present invention is to provide a relatively simple power control system for engines of the type specified which will ensure stability of operation, or will permit regulation of the power output by varying the rate of the fuel feed and/or by varying the load on the engine without the control tending to hunt, stall or overspeed.

Stability of control in engines of the type with which the present invention is concerned constitutes a major problem. Thus for any given setting of a power control member or lever, or for any given operating point of the engine along a curve plotting power output against engine speed or R. P. M. as in Figures 4, 5 and 6, the power required to accelerate or decelerate (indicated by the heavy full line) should be ahead of or lag behind the power then available for acceleration and deceleration (indicated by the dotted line) as illustrated in Figure 4. Note also point 1 in this latter figure which represents a stable condition of operation, or the point attained after acceleration or deceleration is completed and the engine is operating at a steady speed. Should the angle of advance or lag be reduced to a condition such as illustrated in Figure 5, the engine would either stall or overspeed. Where the power required and the power available curves are substantially parallel or cross each other at different times during acceleration or deceleration, as at 2 and 3 in Figure 6, the control will tend to hunt uncertainly between these points. In general, the control will be more stable as the angles between the power available and the power required lines become greater. The foregoing applies particularly to control of power in the normal operating range, but it may apply also to an override or an over-control. If it becomes necessary to use an over-control of unstable characteristics, it should be combined with a stable main control so that the instability period will be short and insignificant in the operating range. It will thus be seen that where two cooperating factors are to be controlled, such as the rate of fuel feed and the load on the engine, care must be taken that the two do not mutually interfere.

The present invention provides an improved control for engines of the type specified which will effectively meet the foregoing requirements.

Other objects are:

To provide a stable control system for gas turbine engines driving a variable pitch propeller wherein a single manual power control member controls both the rate of fuel feed and the load on the engine at a predetermined ratio;

To provide a simple and convenient maximum speed override which may be used for landing approach or other conditions where maximum engine speed at a predetermined rate of fuel feed may be desirable, as where the pitch of the propeller blades is to be set at a minimum angle with the rate of fuel feed just sufficient to maintain the aircraft in flight without stalling;

To provide a fuel feeding device or system for aircraft engines of the gas turbine propeller type which coordinates a stepped-type of manual control, viz., one control lever for starting, the idle range and fuel cut-off, and another lever for the power range which controls both fuel feed and engine speed in a predetermined ratio, with means for maintaining a fixed metering head at any given altitude and a correction for changes in air density which varies the metering head for a given setting of the power control lever;

To provide an improved propeller pitch control mechanism, for use with gas turbine driven variable pitch propellers, wherein the propeller is restrained from pitch reducing motion upon a change in engine control lever setting calling for an increased engine speed; and To generally improve and simplify control systems for power plants of the type specified.

The foregoing and other objects and advantages will become apparent in view of the following description taken in conjunction with the following drawings, wherein.

Figure 1:
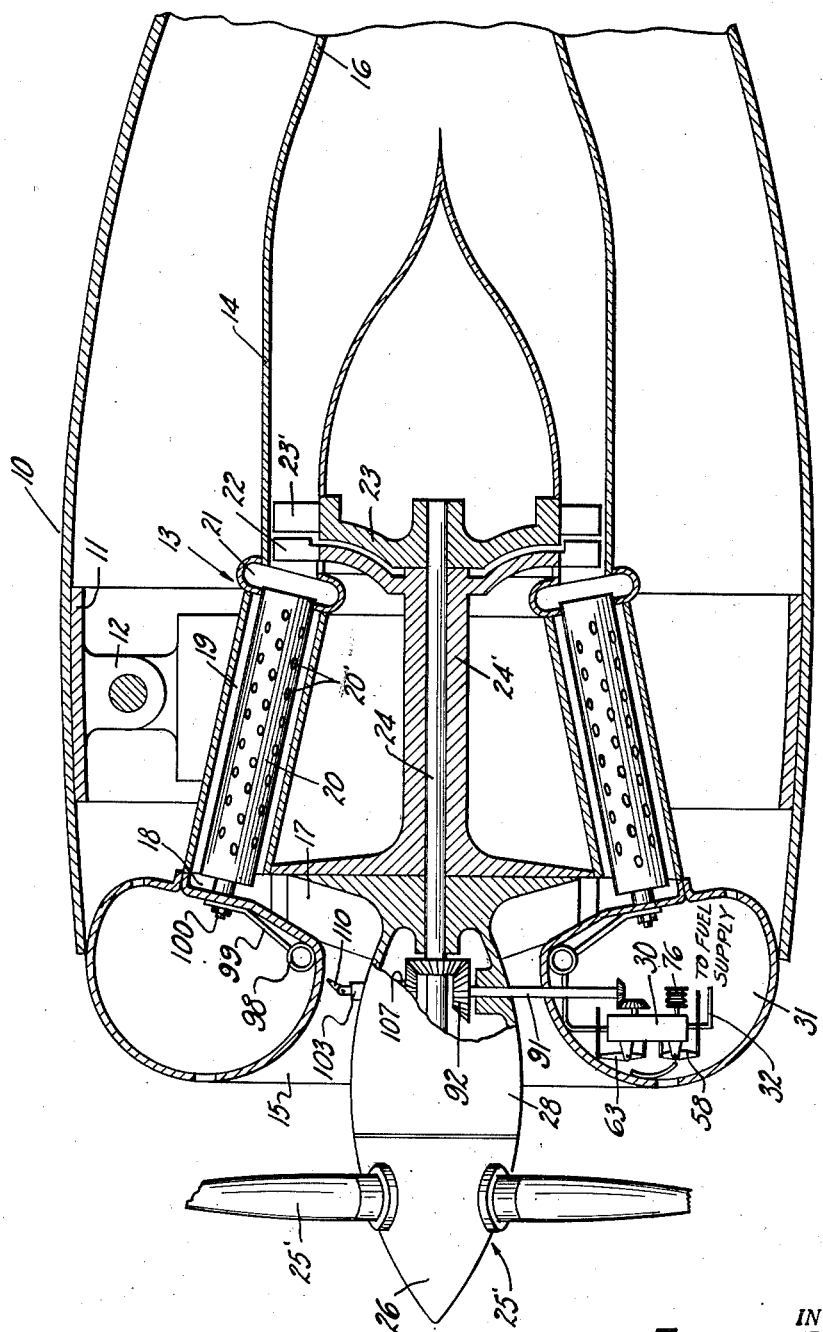
Figure 1 is a substantially central longitudinal sectional view of a gas turbine engine for aircraft incorporating a fuel feed and power control system in accordance with the present invention.

Referring first to Figure 1, an aircraft engine nacelle, indicated at 10, has supported therein as by means of ring 11 and brackets 12 a gas turbine engine, generally indicated at 13 and including an outer casing 14 flared or curved at its front extremity to define an air inlet 15 and contoured at its rear extremity to define a reaction tube 16. A dynamic air compressor 17, shown as of the centrifugal type but which may be of the axial flow or any other suitable type, forces air into an annular header 18 which directs it to a plurality of annularly-spaced generators or burner chambers 19 each containing a burner 20 having air inlet holes 20' in the peripheral walls thereof. The burners 20 discharge into a collector ring 21 arranged to deliver the hot air and products of combustion through a set of stationary directing blades 22 against the blades 23' of a turbine rotor 23. The turbine 23 and air compressor 17 are shown as mounted on a common shaft 24 rotatably supported by a bearing 24'. Air entering the inlet 15 is picked up by the compressor, which acts to direct the air into header 18 and burner chambers 19 and thence into the burners 20 through holes 20', where heat is added by the combustion of fuel. The expanded air and products of combustion are directed against the blades 23' of the turbine 23 to drive the compressor 17 and also a propeller, generally indicated at 25 and including variable pitch propeller blades 25' shown projecting into a housing 26 containing the gear and bearing assembly for the said blades as well as the means for actuating the blades to different angles or pitch. The actuating means may be of the hydraulic, electric or any other suitable type; for the purposes of illustration, an hydraulic actuating unit has been adopted in the present instance, comprising a servomotor contained in the housing 26 and to which flow of hydraulic fluid, usually high pressure oil from the engine lubrication system, is regulated by a servo or pilot valve 27 (shown more or less schematically in Figure 2) controlled in a manner to be described. A predetermined part of the energy derived from the expanded gases may be utilized to obtain a jet thrust, or the exhaust gases only may be utilized in this manner. The drive may be transmitted from the shaft 24 to the propeller through suitable reduction gearing, not shown, contained in an accessory housing 28.

Figure 2:
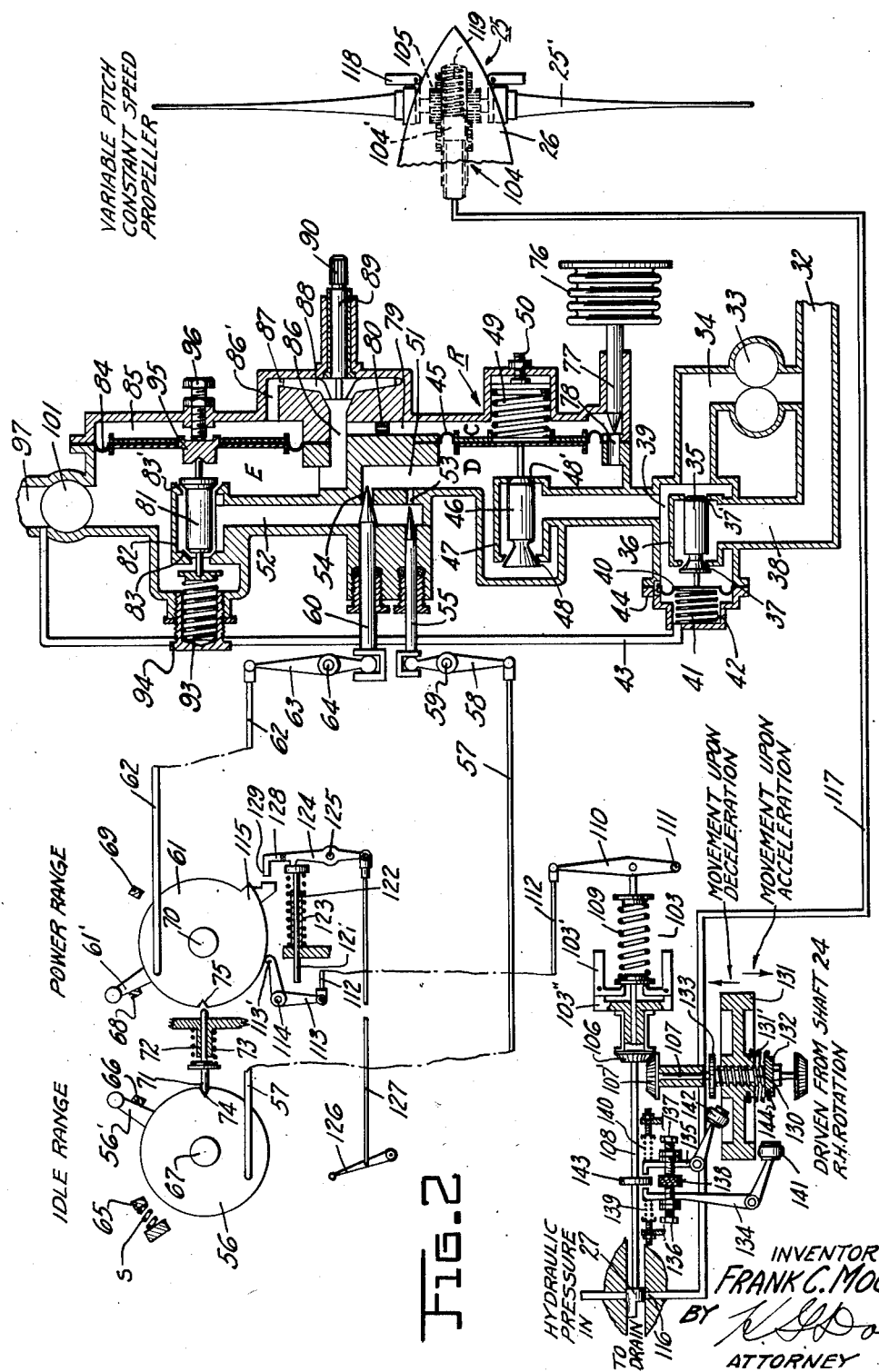
Figure 2 is a detail view in sectional diagram of the fuel feed and power control system.

Referring now to Figure 2, the fuel metering unit is shown schematically, but in the device as actually built, the parts are arranged compactly in a single unit or housing generally indicated at 30, the unit (note Figure 1) preferably being located in the annular chamber 31 defined by the flared front extremity of the casing 14 and which chamber is vented to ram pressure and temperature, although it could be simply vented to the atmosphere if desired. A fuel inlet conduit 32 receives fuel from a suitable source of supply such as a fuel tank, not shown, and has mounted therein a fuel pressuring means such as an engine or turbine driven pump 33 which delivers fuel under pressure to a regulating unit, to be described, by way of a conduit 34. Fuel pump delivery pressure may be maintained at a predetermined value over and above discharge or nozzle pressure by means of a balanced by-pass valve 35 mounted in a housing 36 having fuel inlet ports 37, 37' and communicating with the supply conduit 32 by way of return conduit 38, said valve housing in turn being mounted in a chamber 39 communicating with the high pressure side of the fuel pump or the conduit 34. A diaphragm 40, backed by spring 41, is connected to the stem of the valve 35 and forms a movable wall of a chamber 42 which is vented to metered fuel or discharge nozzle pressure by means of a conduit 43. Spring 41 determines the pressure above discharge pressure at which valve 35 will open and by-pass fuel to the low pressure side of pump 33. The chamber 42 may be vented to chamber 39 by means of a bleed 44, to permit air to escape by way of conduit 34 and thence to the fuel discharge nozzles, and ensure proper functioning of valve 35.

A regulator unit is generally indicated at R and includes a diaphragm 45, which provides a movable partition wall between chambers D and C, and a balanced type of regulator or fuel valve 46, which has its stem connected to said diaphragm and is mounted in a housing 47 receiving fuel from the conduit 34 and provided with ports 48, 48' discharging into chamber D. The diaphragm 45 is engaged by spring 49, adjustable by means of screw 50. This spring is of a spring rate such as will maintain a predetermined substantially constant differential across the diaphragm 45.

Fuel from chamber D flows by way of conduit 51 to metered fuel conduit 52, either through idle metering restriction 53 or through both the idle metering restriction 53 and a power metering restriction 54. The idle restriction 53 is controlled by an idle needle valve 55 which is connected to a rotatable manual control member 56 by means of suitable linkage including a rod 57 and a lever 58 fulcrumed at 59; while the power restriction 54 is controlled by power needle valve 60 which is operatively connected to a rotatable manual power control member 61 by means of suitable linkage including a rod 62 and lever 63 which is fulcrumed at 64.

The manual control member 56 is adapted to control fuel feed to the engine over the idle range, and it may have a lower position than that shown for starting, fuel cut-off and other purposes; it is provided with a lever 56' and has its low and high idle positions determined by stops 65 and 66; it is rotatably supported by a shaft 67. The manual control member 61 is adapted to control fuel feed to the engine over the power range and it is also preferably connected to the propeller pitch governor to control the load on the engine in a manner to be described; it is provided with a lever 61' and has its low and high power positions determined by stops 68 and 69; it is rotatably supported by a shaft 70.

Figure 3:
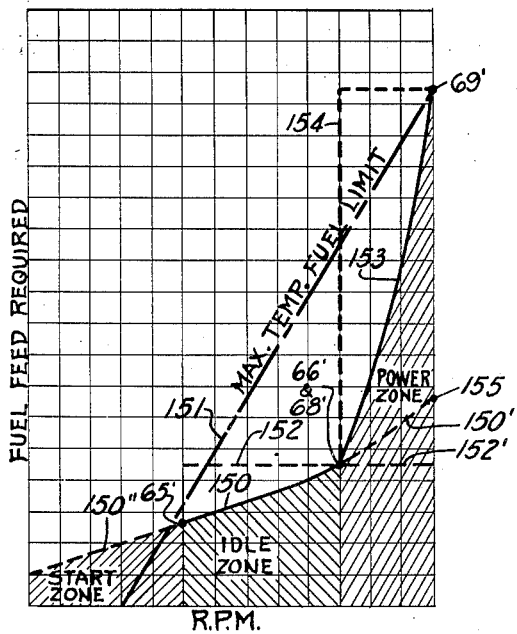
Figure 3 is a curve chart illustrating the characteristics of the control.

The function and operation of these controls are correlated with the curve chart of Figure 3.

Means are provided whereby when the control member 56 is rotated to its high idle position, it will be automatically releasably latched in said position while at the same time it will release or unlatch the control member 61, which is latched against rotation as long as the idle control member is clear of its high idle position, said means as here shown consisting of a detent assembly including a latch pin 71 mounted for sliding movement in a sleeve 72 and normally urged to the left or towards the peripheral surface of the member 56 by means of a spring 73.

Notches 74 and 75 are formed in the peripheries of the control members 56 and 61, the respective locations of these notches being such that up until the time the idle lever 56' is against the stop 66, the member 61 will be held against rotation; but when the lever 56' engages the stop 66, the latch pin 71 will engage in the notch 74 and release itself from the notch 75, whereupon the member 56 will be releasably held against rotation while the member 61 will be free for rotation.

To compensate for changes in density of the air flowing to the engine, means are provided for varying the differential across the restrictions 53 and 54 at a given position of valves 55 and 60, such means comprising a capsule or bellows 76 loaded in a manner such as to render it responsive to changes in temperature and pressure and mounted at a point where it will be exposed to ram pressure and temperature, such as the chamber 31. A capsule or bellows suitable for such service is illustrated and described in U. S. Patent No. 2,376,711, granted to F. C. Mock, May 22, 1945. The capsule 76 has a needle valve 77 connected to the movable end thereof and adapted to control the area of a port 78 which communicates chamber D with chamber C. The metered fuel in conduit 52 flows to a chamber E across a normally open over-speed valve, to be described, and chamber C communicates with chamber E by way of a conduit 79 having a calibrated restriction 80 therein. At any given position of the feed valve 60, the needle valve 77 will control the area of port 78 and vary the differential between chambers D and E in response to changes in air density in a manner which will be more fully hereinafter described in connection with the operation of the entire control system.

An over-speed governor is provided and consists of a valve 81 shown as of the balanced type and mounted in a housing 82 defining a valve chamber in series flow relation with the metered fuel conduit 52 and provided with ports 83 and 83'. The valve 81 has its stem connected to a diaphragm 84 which forms a movable partition wall between metered fuel chamber E and a pressure chamber 85. Conduits 86 and 86' communicate the chamber E with the chamber 85 by way of an impeller chamber 87, in which is mounted a centrifugal impeller 88 provided with a drive shaft 89 carrying a drive pinion 90 which may be operatively connected to the engine as by means of shaft 91 and gear 92 (Figure 1) so that the impeller 88 is driven in relation to engine speed and will therefore maintain a pressure in chamber 85 greater than the pressure in chamber E by an amount proportional to engine speed squared, and therefore varying as a function of engine speed. When the differential pressure across diaphragm 84 attains a predetermined value, dependent upon the speed of the engine, it moves valve 81 towards closed position and restricts the flow of metered fuel through ports 83, 83'. Valve 81 is normally held open by a spring 93, which is adjustable by socket nut 94 and urges the valve against an abutment 95 forming part of a plate for supporting and stiffening the diaphragm 84 and which abutment is backed up by an adjusting screw 96. Valve 81 may be adjusted by screw 96 to a normal position such that the area of ports 83, 83' is well in excess of the maximum area of feed restrictions 53 and 54 when valves 55 and 60 are wide open.

A discharge conduit 97 conducts the metered fuel to a manifold ring 98, note Figure 1, from which the fuel flows by way of a series of manifold pipes 99 to discharge nozzles 100, adapted to discharge fuel in the form of a fine spray into the burners 20.

A cut-off valve 101 is preferably mounted in the discharge conduit 97 for positively cutting off flow of fuel to the nozzles whenever desired, as when the engine is stopped.

The power control member 61 is operatively connected to means for varying the load on the engine in coordinated predetermined relation to the feed of fuel to the burners, such means in the present instance being in the form of a propeller pitch governor, generally indicated at 103, and shown more or less schematically in Figure 2. The governor 103 is adapted to control the servo or pilot valve 27 which regulates hydraulic flow to a servomotor 104 including an outer cylindrical piston 104' operatively connected to the propeller blades as by gearing 105. The governor 103 includes weights 103' which are pivotally mounted on a bracket 103'' connected to a gear 106 which may be driven from the engine through the medium of a shaft 107 and bevel gear 107', the shaft 107 having a driving connection with the shaft 24. The governor weights are connected to the pilot valve 27 by means of a stem 108 which projects through the hub of the gear 106 and is subject to the pressure of a governor spring 109 adapted to be loaded by a lever 110 pivotally anchored at 111. The lever 110 is connected by means of a link 112 to the one arm of a bell crank lever 113 pivoted at 114, the other arm of said lever being provided with a follower 113' adapted to engage a load control cam 115 formed on the peripheral surface of the power control member 61.

The operation of variable pitch constant speed propellers of the type herein shown is well understood by those skilled in the art, and hence the servomotor 104 and coacting parts are shown only schematically since the details thereof form no part of the present invention. Briefly stated, when at a given engine speed the spring 109 is compressed sufficiently to displace the pilot valve 27 to the left from port 116 and at the same time move the governor weights inwardly (the underspeed condition of the governor), oil under pressure flows through the conduit 117 and actuates the servo piston 104' in a direction such as to change the angle of the blades from high to low pitch; whereas when the tension of the spring 109 is lessened at a given engine speed the governor weights fly out, (the overspeed condition of the governor) the pilot valve 27 moves to the right, opening port 116 to drain and centrifugal force generated through rotation of the propeller acts on counterweights 118 connected to the propeller blades to change the angle of the blades from low to high pitch, this action being assisted by a spring 119 which normally urges the servo piston toward its high pitch position. When a balanced condition is attained (the governor weights in balance with engine speed as determined by the setting of the governor spring 109), the pilot valve 27 is in a neutral position, closing port 116.

There may be conditions during operation of the engine when it will prove desirable to override the load control cam 115 as, for example, where maximum engine speed is to be maintained for a period of time with low propeller power absorption in order to place the engine in position to quickly develop maximum power output without waiting for the engine to accelerate, as will appear more fully hereinafter. Such override means may comprise a plunger 121, slidably mounted in a sleeve 122 against the resistance of a return spring 123, said plunger being adapted to contact bell crank lever 113 when urged to the left by pivotally mounted lever 124 secured on a rotatable shaft 125 and connected to a manual lever 126 by rod or link 127. The lever 124 is provided with an offset extension 128 adapted to engage a lug 129 on member 61 to ensure a minimum opening of feed valve 60 when the load control cam 115 is overridden by operation of lever 126, for reasons which will later appear.

To ensure against surging of the control in a manner to be hereinafter explained in the description of operation, means is provided for preventing a momentary decrease in pitch of the propeller blades upon acceleration movement of the power quadrant 61 and a momentary increase in pitch at the start of the deceleration movement of said quadrant. In the example illustrated, the shaft 107 is provided with a worm or screw-threaded section 130, and thereon is mounted for limited axial movement an inertia or fly-wheel 131 having its hub 131' internally threaded for engagement with the worm section 130. Axial movement of the wheel 131 is limited by adjustable stops 132 and 133. A pair of pivotally mounted bell crank levers 134 and 135 are provided with adjustable stops 136 and 137 and are normally spring-urged lightly against a stop member 138 by adjustable springs 139 and 140 which are sufficiently light so as not to interfere with normal movement of the governor rod 108. Contact rollers or followers 141, 142 are mounted on the arms of the bell cranks 134 and 135 which lie adjacent the wheel 131, while the other or oppositely extending arms are adapted to be engaged by a contact member 143 fixed on the stem 108 of the pilot or servo valve 27. It will be seen that relative rotary or angular movement between engine shaft 107 and wheel 131 will result in axial travel of said wheel, the speed or rate of such travel being determined in part by the pitch of the threads which constitute the worm section 130 and the rate of acceleration or deceleration of the engine driven shaft 107. It will also be noted that should the pilot valve 27 be urged to the left when wheel 131 is in engagement with roller 141, it will be prevented from so doing by the lever 134 although it may at that time move to the right; the converse being true when the said wheel is in engagement with the roller 142. In order to recenter the wheel 131 between the stops 132 and 133 when the acceleration of the engine drops below a predetermined minimum value, a torsion spring 144 is provided having its ends secured to the hub of wheel 131 and stop 132.

Operation

Ordinarily the system would be filled with fuel to the discharge nozzles 100, but assuming it to be empty at ground level, then regulator valve 46 would be in wide open position and idle feed valve 55 would be open at least sufficiently to permit enough fuel for starting purposes to pass through the restriction 53. If the engine is now cranked, fuel will flow through conduits 32, 34, 34' and ports 48, 48' into and fill chamber D of the regulator R and thence flow by way of conduit 51 through idle restriction 53, conduit 52 into metered fuel chamber E, valve 81 being normally in wide open position. From chamber E, metered fuel flows by way of conduit 97, manifold ring 98 and tubes 99 to the discharge nozzles 100. Assuming the engine to be operating at ground level, the aneroid needle 77 will be retracted and fuel will also flow from chamber D to chamber C by way of orifice 77 and thence through restriction 80 to metered fuel chamber E.

The spring rate of spring 49 with respect to the range of movement of the diaphragm 45 is such that for all practical purposes, the force exerted by said spring may be considered as remaining constant, and therefore the respective pressures in chambers D and C will tend to bear a constant relative value, so that the valve 46 will open or close to maintain the pressure in chamber D equal to that in C plus the pressure equivalent of spring 49. Hence a predetermined substantially constant differential will be maintained across the diaphragm, varying only momentarily as the pressure in either of said chambers is disturbed.

The chambers D and E are in effect connected by two flow passages in parallel, one comprising the passage 51, restrictions 53 and 54 (assuming operation in the power range), passage 52 and ports 83, 83', and the other comprising the variably controlled orifice or port 78, chamber C, and passage 79 having the restriction 80 therein.

The quantity of fuel supplied to the burners may be varied by varying the area of feed restrictions 53, 54 and/or by varying the head (pressure in D minus pressure in E) causing flow. The area of the feed restrictions is controllable manually by levers 56' and 61', whereas the differential across said restrictions is under the control of the regulator R and its interrelated density controlled valve 77. Opening or closing movements of feed valves 55 and/or 60 momentarily varies the pressure in chamber D and consequently changes the differential across diaphragm 45 from the value set by spring 49; however, the valve 46 is immediately repositioned to restore the differential across said diaphragm and also across said feed restrictions, the differential thereafter being maintained constant.

As the density of the air decreases (which may result from a gain in altitude if the engine is used in an aircraft) the speed of the engine or turbine-compressor combination will tend to increase at a given rate of fuel flow, since the compressor will deliver less air and will therefore require less power to drive it. Hence, the fuel flow to the burners must be reduced with a decrease in air density to maintain the turbine speed substantially constant for a given setting of the levers 56' and 61'. Also, without compensation for changes in air density, there is danger of overheating the burner and turbine system when accelerating at altitude or under decreased air densities since the ratio of liquid fuel to air then increases and this greatly increases the heat of combustion. It is the function of the variable port or orifice 78 and restriction 80 to vary the differential across the feed restrictions 53 and 54 with changes in air pressure and temperature to thereby vary the fuel flow to the burners as desired.

The regulator R functions to establish an absolute pressure in chamber D which is greater than the pressure in C by the pressure value of the spring 49, and at the same time it establishes an absolute pressure in chamber C sufficiently greater than the pressure in chamber E that the fuel flowing through orifice 78, as determined by the area of orifice 78 and the constant head thereacross as maintained by spring 49, can be forced through the restriction 80 into the chamber E. The metering head across the feed restrictions 53 and 54 (pressure in D minus the pressure in E) is equal to the head across orifice 78 (pressure in D minus the pressure in C) plus the head across restriction 80 (pressure in C minus the pressure in E). The spring 49 and diaphragm 45 maintain a constant differential across orifice 78 and hence the flow through orifice 78 will increase or decrease as the valve 77 opens or closes. Since the fuel flowing through orifice 78 must also flow through the fixed restriction 80, it follows that the head across orifice or restriction 80 will increase or decrease with opening or closing of valve 77. As a consequence, the total drop in pressure from chamber D to chamber E will increase or decrease as the valve 77 opens or closes. Thus as the capsule 76 expands in response to a decrease in the density of the air flowing to the engine and needle 77 progressively restricts orifice 78, the differential across feed restrictions 53 and 54 is correspondingly decreased and less fuel will be fed for any given area of feed restrictions 53 and 54.

Referring now to Figure 3, which represents the operating characteristics of the present control at a given altitude, such as ground level, the full line curve 150 and its dotted extension 150' indicates roughly the fuel feed required to drive the engine with the propeller in its minimum or zero pitch position. Along this line, the points 65' and 66' (or 68') correspond to the low and high settings of the idle lever 56', with the power lever 61' in its low setting against stop 68. The dotted line 150'' at the origin of curve 150 represents the fuel required for starting purposes; it may be reached by moving the idle lever 56' to the extreme left and compressing spring s while the engine is being cranked.

The dot and dash line 151 represents a maximum rate of fuel feed which may be maintained at a given speed for any material length of time without danger to the burner system; it may be exceeded for a brief period only during acceleration. Between points 65' and 66' the idle lever 56' is used to control the rate of fuel feed. Its low idle position against stop 65 may be just sufficient to maintain the engine in operation at ground level, while its high idle position may be used for warming-up purposes in preparation for flight or low power approaches in landing or other similar uses. This zone of operation is identified as the idle zone on Figure 3.

The dotted line 152 and its extension 152' represents the quantity of fuel supplied through the idle feed restriction with the idle valve 55 fully withdrawn, as when the lever 56' is against stop 66, the quantity or rate of fuel flow being determined by the full area of orifice 53 and the constant head thereacross as maintained by regulator R. If the idle needle 55 is suddenly retracted by lever 56', acceleration will take place along the dotted line 152 until point 66' is reached, at which the fuel supplied becomes equal to the fuel required, and equilibrium operation results. During this acceleration there is a brief period when the fuel feed exceeds the maximum set by line 151, as illustrated in Figure 3. If the needle 55 is only partially retracted, acceleration will take place along a line parallel to but lower than line 152, the point of equilibrium operation being determined by the intersection of such a line and the fuel curve 150.

When the idle lever has been turned to position 66', latch pin 71 releases quadrant 61, and power lever 61' is then used for controlling the power output in the power zone. In the position shown in the drawings, power control member or quadrant 61 has been released, the idle feed valve 55 has been retracted and the power feed valve 60 is closed. If the power lever 61' is now moved toward stop 69, power needle 60 will be retracted and both feed restrictions 53 and 54 will be open for parallel flow. If the lever 61' is moved slowly, acceleration will take place substantially along line 153, each point on this line corresponding to equilibrium operation for a particular setting of power needle 60; and when lever 61' is in its maximum power position, operation will be at point 69'. If the power lever 61' is suddenly moved clockwise from a position against stop 68 to a position against stop 69, acceleration will take place along the dotted line 154 to point 69'.

The shape or characteristic of curve 153 is determined by the contour of cam 115 on the quadrant 61. As the power lever 61' is turned clockwise, or in a power increasing direction, cam 115 acting through lever 113, link 112 and lever 110 compresses governor spring 109, thereby selecting the speed at which the variable pitch propeller will hold the engine for the fuel feed then being supplied. Through the idle zone the governor spring 109 is set for a speed equal to that at point 66', but the rate of fuel feed except when lever 56' is against stop 66, is insufficient to drive the engine that fast. As a consequence the propeller governor throughout this range will be acting in pitch decreasing direction and will hold the propeller to its low stop position.

As the power lever 61' is advanced the governor spring 109 is compressed, thereby calling for a higher governed speed than that at 66' but a lower speed than the speed at which the engine would run if the propeller remained in its minimum pitch position. The net result therefore is that the propeller pitch increases and absorbs an increasing portion of the power being delivered by the engine.

If while operating at an intermediate setting in the power range the power lever 61' is suddenly advanced, cam 115 and its related links further compress spring 109, thereby calling for a higher governed speed; also, fuel needle 60 is further opened to provide more than sufficient additional fuel to attain the new speed with the existing propeller pitch setting, with the consequent necessity for the propeller pitch ultimately to increase in order to prevent the engine speed from exceeding the selected value. During the acceleration period, however, the governor 103 senses the deficiency in speed and tends to operate the valve 27 in a direction to decrease the pitch to facilitate engine acceleration, and thereafter to advance the pitch beyond that previously present in order to maintain the selected speed. This characteristic is exaggerated in turbine type engines due to their relatively slow acceleration resulting from high inertia of the rotating mass. In certain types of aircraft the initial loss in propeller propulsion followed several seconds later by a net gain is highly undesirable.

Such a result may be avoided in aircraft of this type by the use of means such as the inertia wheel 131, which operates as follows: When acceleration initially takes place, the engine-driven shaft 107 momentarily rotates faster than the wheel, causing the latter to move axially on the worm section 130 and engage the roller 141 holding bell crank 134 against movement and consequently preventing valve 27 from moving to the left and uncovering port 116 to hydraulic pressure while the inertia of the engine is being overcome. The wheel 131 will remain against its stop 132 only so long as the rate of acceleration of the engine exceeds a predetermined value sufficient to hold the wheel down against the force of the light torsion spring 143. This tendency toward a decrease in pitch is only momentary, however, since the increased speed of the engine resulting from the increased rate of fuel feed soon causes the governor weights to fly out, moving valve 27 to the right and opening port 116 to drain while at the same time the counterweights 118, plus force of spring 119, act to increase the pitch of the blades to an angle such that the power over and above that required to drive the turbine and compressor is absorbed by the propeller. When this condition is attained, pilot valve 27 closes port 116 and the speed of the engine will thereafter remain substantially constant until the setting of the power quadrant 61 is again changed. The range of axial movement of wheel 131 between stops 132 and 133 should obviously be such as to permit proper functioning of the valve 27 when the wheel 131 is centered.

Figure 4:
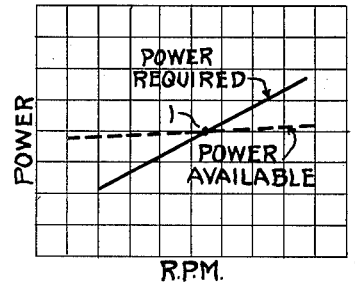
Figures 4, 5 and 6 are additional curve charts illustrating certain factors which affect stability in controls for engines of the variable speed, variable load type.
Figure 5:
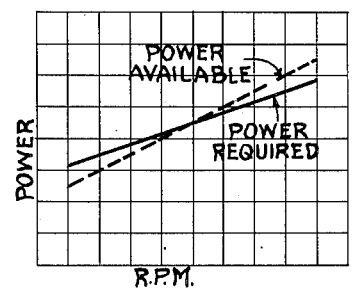
Figure 6:
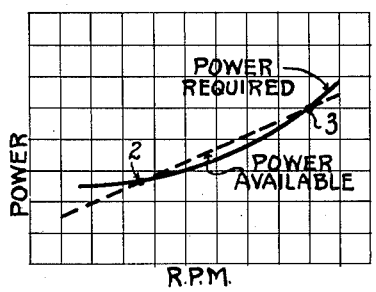
Figure 7:
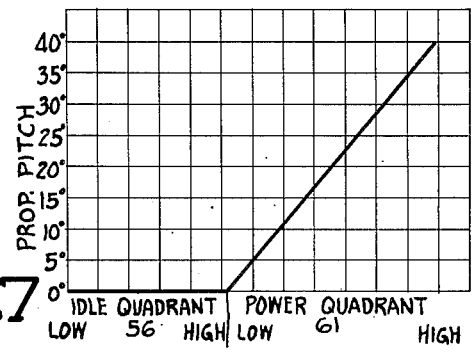
Figure 7 is a further curve chart showing the preferred coordination of the propeller pitch control with the fuel-feed controls.

Figure 7 illustrates approximately how the pitch angle of the propeller varies with respect to the position of the idle quadrant 56 and the power quadrant 61. As pointed out above, the initial setting of the governor 103 is preferably such that throughout the idle range of control, the pitch of the propeller blades will be at a minimum or substantially zero angle. In Figure 3, the dotted extension 150' of the curve 150 represents the fuel used in the power zone for merely driving the turbine and compressor with the propeller in minimum pitch, and the vertical distance between curve 153 and the dotted curve 150' represents the take-off power absorbed by the propeller at increased pitch through the power zone due to the action of the load cam 115. Obviously, the propeller pitch characteristic of Figure 7 and the characteristic of curve 153 may be readily varied by varying the contour of cam 115, however, it should be so selected that the desired angle between the "power required" and the "power available" lines of Figure 4 may be attained.

When power lever 61' is moved from stop 69 back to stop 68 to decelerate, fuel feed to the burners is suddenly decreased and the engine, as momentum is overcome, slows down; at the same time the cam 115 acts through lever 113 to relieve the pressure on governor spring 109. While this action on the governor spring is in a direction to momentarily increase the pitch of the propeller blades, such increase cannot take place even momentarily, since the wheel 131 then rotates faster than the shaft 107 and the wheel moves against the roller 142, preventing the valve 27 from moving toward the right and uncovering port 116 to drain. In the meantime, the reduced engine speed reduces the velocity of the governor weights to a point where the latter move inwardly, the tension of spring 103' then moving pilot valve 27 to the left to admit hydraulic pressure to the servo piston 104 and cause the latter to move the propeller blades to the low pitch position against the gradually decreasing resistance offered by the counterweights 118, whereupon the governor spring 103' will maintain pilot valve 27 in a closed position or beyond such position to the left of port 116, so that at all engine speeds below high idling, hydraulic pressure will hold the propeller blades in the low pitch position. During deceleration, the contour of cam 115 also determines the angle between the "power required" and "power available" lines to the left of point 1 in Figure 4.

Under certain conditions, it may be desirable to operate the propeller power take-off on either of two schedules, one from the point 68' of Figure 3 along the line 153 to point 69' for normal operation, and the other from point 155 to point 69' for purpose of emergency or quick acceleration of the aircraft. In the latter case, the hand lever 126 and connected lever 124 may be selectively actuated to move the plunger 121 against the lever 113 and override the cam 115, thereby setting the governor spring 109 for the maximum operating speed. Preferably, the lever 124 is provided with the extension 128 adapted to engage the lug 129 so as to simultaneously rotate the power quadrant 61 and open the feed valve 60 sufficiently to increase the fuel feed to a value corresponding to that at point 155. Operation of lever 126 with the engine operating at point 66' causes the engine to accelerate along curve 150' and to reach equilibrium operation at point 155. Upon subsequent opening movement of the power lever the increased power output is quickly absorbed by increase in propeller pitch, thereby avoiding the delay in accelerating the rotating mass of the engine and greatly increasing the available rate of acceleration of the aircraft.

In the event that the engine should overspeed, or the speed thereof should rise beyond a predetermined maximum, the pressure generated in chamber 85 will tend to close the valve 81 until the speed of the engine is reduced to a safe value.

It will be understood that the parts of the system have been illustrated schematically to conserve space in the drawings and that in actual practice the parts of the system may be arranged in any manner desired to carry out the functions and operations heretofore described within the scope of the invention as defined by the appended claims.

I claim:

1. In a power control system for engines of that type utilizing a gas turbine drivably connected to a load and a burner or generator to which air is supplied under pressure by a dynamic compressor, a fuel conduit for conducting fuel under pressure to the burner having a variable metering restriction therein, an element for varying the area of said restriction, means for maintaining a fixed metering head across said restriction at a given position of said element and at a given entering air density, means for varying the load on the engine, and a manually operable power control member having an operative connection with said element and said load varying means for obtaining predetermined ratios of load take-off and rate of fuel feed with change in the setting of the power control member.

2. In a power control system for engines of that type utilizing a gas turbine drivably connected to a load and a burner or generator to which air is supplied under pressure by a dynamic compressor, a fuel conduit for conducting fuel under pressure to the burner having a variable metering restriction therein, an element for varying the area of said restriction, means for maintaining a fixed metering head across said restriction at a given position of said element and at a given entering air density, means for varying the load on the engine, a manually operable power control member having an operative connection with said element and said load varying means for obtaining predetermined ratios of load take-off and rate of fuel feed with change in the setting of the power control member, and means for modifying the metering head in relation to changes in air density.

3. In a power control system for engines of that type utilizing a gas turbine drivably connected to a load and a burner or generator to which air is supplied under pressure by a dynamic compressor also driven by the turbine, a fuel conduit for conducting fuel under pressure to the burner having a variable metering restriction therein, an element for varying the area of said restriction, means for maintaining a fixed metering head across said restriction at a given position of said element and at a given entering air density irrespective of changes in engine speed, a manually-operable power control member having an operative connection with said element for varying the rate of fuel feed, and cam means movable by said power control member to vary the load on the engine and correlate power take-off with the rate of fuel feed with variation in control member setting.

4. In a power control system for engines of that type utilizing a gas turbine drivably connected to a load and a burner or generator to which air is supplied under pressure by a dynamic compressor also driven by the turbine, a fuel conduit for conducting fuel to the burner having a variable metering restriction therein, means for creating a flow of fuel under pressure through said conduit, an element for varying the area of said restriction to control feed of fuel to the burner, means for maintaining a substantially constant metering head across said restriction at a given position of said element and at a given entering air density irrespective of changes in engine speed, means for varying the load on the engine including a variable speed governor, and a manually operable power control member connected to said element and to said governor for correlating power take-off with the rate of fuel feed.

5. In a power control system for an engine utilizing a gas turbine and a burner or generator to which air is supplied under pressure by a dynamic compressor, a variable pitch selective speed propeller driven by the turbine, means for feeding fuel to the burner including a feed valve movable to vary the rate of fuel feed and means for maintaining the rate of feed constant at any given position of said valve irrespective of changes in engine speed, means for varying the pitch of the propeller blades, a manually operable power control member, means operatively connecting said member to said valve and to said pitch-varying means for obtaining a predetermined schedule of fuel feed to power take-off through an operating range of the control member, and means for selectively overriding said connection between the power control member and said pitch-varying means.

6. In a power control system for power plants utilizing a gas turbine and a burner or generator to which air is supplied under pressure by a dynamic compressor, a fuel metering device having a pair of feed restrictions arranged for parallel flow and separately operable feed valves controlling said restrictions, a pair of manually-operable control members, one for each of said feed valves, one of said control members covering a range of idle feed and the other of said control members covering a range of power feed, means for varying the load on the turbine, and means connected to said other control member having an operable connection with said load varying means.

7. In a power control system for engines utilizing a gas turbine and a burner or generator to which air is supplied under pressure, a variable pitch propeller driven by the turbine, a propeller pitch governor having a movable control element, a fuel metering device provided with a pair of fuel feed restrictions arranged in parallel, independent feed valves for controlling the respective areas of said restrictions, one of said fuel valves and its coacting restriction being calibrated to control the rate of fuel feed over the idling range and the other of said valves and its coacting restriction being calibrated to control the rate of feed over the power range, means for maintaining a fixed metering head across said restrictions irrespective of changes in engine speed, an idle quadrant operatively connected to said one valve and a power quadrant connected to said other valve, and cam means movable with said power quadrant and operatively connected to said governor control element for obtaining a predetermined schedule of load take-off relatively to the rate of fuel feed.

8. A power control system as claimed in claim 7 wherein means are provided for selectively overriding said cam means.

9. In a power control system for engines utilizing a gas turbine and a burner or generator to which air is supplied under pressure, a fuel conduit for conducting fuel under pressure to the burner having a variable metering restriction therein, an element for varying the area of said restriction to control feed of fuel to the burner, means for maintaining a predetermined differential across said feed restriction, an overspeed valve in series flow relation to said restriction, pressure-responsive means connected to said overspeed valve, a centrifugal governor driven in relation to engine speed for applying fluid pressure to said pressure-responsive means proportional to engine speed in a direction tending to close the overspeed valve, and adjustable resilient means normally maintaining the overspeed valve in open position.

10. In a power control system for an engine arranged to drive a propeller having variable pitch propeller blades, a fuel feeding device provided with a control element for varying the rate of fuel feed, a propeller pitch governor having a control element adjustable to coordinate engine load with power output, a power control member, means operatively connecting said member with said control elements, and means responsive to changing engine speeds and operatively associated with said governor for automatically momentarily exerting a force on said governor opposing the normal governor adjustment that results when said power control member is operated to vary the rate of fuel feed, said latter means including an inertia device rotatable in synchronism with the engine and automatically movable in an axial direction to different positions to initiate said opposing force during acceleration and retardation of the engine when the inertia of the latter causes momentary unsynchronized movement of said inertia device with respect to the engine.

FRANK C. MOCK.

REFERENCES CITED

The following references are of record in the file of this patent:

UNITED STATES PATENTS

| Number | Name | Date |
|---|---|---|
| 1,226,073 | Herr | May 15, 1917 |
| 2,303,998 | Holley | Dec. 1, 1942 |
| 2,306,953 | Jung | Dec. 29, 1942 |
| 2,336,052 | Anderson | Dec. 7, 1943 |
| 2,343,378 | Kieser | Mar. 7, 1944 |
| 2,375,429 | Martin | May 8, 1945 |
| 2,379,455 | Prince | July 3, 1945 |
| 2,389,003 | Schorn | Nov. 13, 1945 |
| 2,391,323 | Martin | Dec. 18, 1945 |
| 2,396,618 | Stieglitz et al. | Mar. 12, 1946 |
| 2,399,685 | McCoy | May 7, 1946 |
| 2,427,794 | Lee | Sept. 23, 1947 |
| 2,457,595 | Orr | Dec. 28, 1948 |